United States Patent Office 3,033,642
Patented May 8, 1962

3,033,642
METHOD OF REMOVING HYDROGEN AND OXYGEN FROM GASEOUS MIXTURES
Stanley W. Bukata, Buffalo, and Paul E. Pickert, North Tonawanda, N.Y., and Donald C. Freeman, Jr., Durham, N.C., assignors to Union Carbide Corporation, a corporation of New York
No Drawing. Filed Aug. 31, 1959, Ser. No. 836,884
19 Claims. (Cl. 23—2)

This invention relates to a method of removing oxygen from an oxygen-containing gas mixture. More particularly, the invention relates to a process for removing oxygen from an oxygen-containing gas mixture by contact with crystalline zeolitic molecular sieves.

According to the prior art, oxygen is removed from gases such as the rare inerts by passage over hot copper metal, by consumption in the burning of hydrogen or sulfur, or by adsorption at low temperatures. All of these methods have certain disadvantages as for example necessitating large quantities of reactants, external refrigeration, or contamination of the oxygen-depleted gas product by the reactants.

The principal object of the invention is to provide an improved process for removing oxygen from an oxygen-containing gas mixture. A further object is to provide a process for oxygen removal from a gas mixture which does not involve burning, and hence eliminates undesirable contamination of the oxygen-depleted gas. A still further object is to provide a process for oxygen removal which does not require external refrigeration with its attendant complexities and expense. Other objects will be apparent from the subsequent disclosure and appended claims.

These objects are achieved in a remarkable manner by the present invention, in which a bed of elemental silver-containing crystalline zeolitic sieve material is provided, and contacted with the oxygen-containing gas mixture for oxygen sorption thereby. The resulting oxygen-depleted gas is discharged from the bed, and the sieve material may be regenerated for reuse in the process when it becomes loaded with oxygen.

The term "zeolite," in general, refers to a group of naturally occurring and synthetic hydrated metal aluminosilicates, many of which are crystalline in structure. There are, however, significant differences between the various synthetic and natural materials in chemical composition, crystal structure and physical properties such as X-ray powder diffraction patterns.

The structure of crystalline zeolite molecular sieves may be described as an open three-dimensional framework of $SiO_4$ and $AlO_4$ tetrahedra. The tetrahedra are cross-linked by the sharing of oxygen atoms, so that the ration of oxygen atoms to the total of the aluminum and silicon atoms is equal to two, or $O/(Al+Si)=2$. The negative electrovalence of tetrahedra containing aluminum is balanced by the inclusion within the crystal of cations, for example, alkali metal and alkaline earth metal ions such as sodium, potassium, calcium and magnesium ions. One cation may be exchanged for another by ion-exchange techniques.

The zeolites may be activated by driving off substantially all of the water of hydration. The space remaining in the crystals after activation is available for adsorption of adsorbate molecules. Any of this space not occupied by reduced elemental metal atoms will be available for adsorption of molecules having a size, shape and energy which permits entry of the adsorbate molecules into the pores of the molecular sieves.

The present invention is predicated on the discovery that oxygen is sorbed at room temperature by elemental silver-containing crystalline zeolite molecular sieves of suitable pore size. That is, the pores must be sufficiently large to permit entry of the oxygen molecules. Molecular sieves having pores with a minimum dimension of at least 4 Angstrom units have been found satisfactory. It should be understood that the oxygen sorption characteristic relates to the zeolite when its cation has been substantially changed to silver or hydrogen. This is because, in those zeolites having an effective pore size which is just slightly larger than the oxygen molecule, the effective pore size is controlled by the size of the cation.

The elemental silver-containing zeolitic molecular sieves which are suitable for practicing this invention are preferably obtained by ion exchange with certain naturally occurring and synthetic molecular sieves, in the manner disclosed and claimed in copending application Serial No. 762,951, filed September 24, 1958. Briefly, this method includes the step of intimately contacting the zeolitic molecular sieve starting material with an aqueous solution of a water soluble silver salt whereby ion-exchange of the metal cations of the zeolitic molecular sieve and the aqueous solution occurs. The sieve is separated from the aqueous exchanging solution and dried so that substantially all of the water is removed from the sieve. Dehydration or activation may for example be effected by partial evacuation at a temperature of 200° C. to 500° C. (preferably about 300° C.). The zeolitic molecular sieve is then contacted with a reducing agent whereby the silver cations to be deposited which are present in the molecular sieve structure are reduced to the elemental metal.

The zeolites occur as agglomerates of fine crystals or are synthesized as fine powders and are preferably tableted or pelletized for large scale adsorption uses. Pelletizing methods are known which are very satisfactory because the sorptive character of the zeolite, both with regard to selectivity and capacity, remains essentially unchanged.

Among the naturally occurring zeolitic molecular sieve suitable for ion exchange with a silver salt are chabazite, faujasite, erionite and mordenite. The natural materials are adequately described in the chemical art. The preferred synthetic zeolitic molecular sieves include zeolite A, D, L, R, S, T, X and Y.

Zeolite A is a crystalline zeolitic molecular sieve which may be represented by the formula:

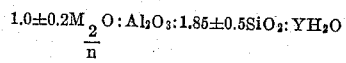

wherein M represents a metal, $n$ is the valence of M, and Y may have any value up to about 6. The as-synthesized zeolite A contains primarily sodium ions and is designated sodium zeolite A. Zeolite A is described in more detail in U.S. Patent No. 2,882,243, issued April 14, 1959.

Zeolite D is a crystalline zeolitic molecular sieve which is synthesized from an aqueous aluminosilicate solution containing a mixture of both sodium and potassium cations. In the as-synthesized state, zeolite D has the chemical formula:

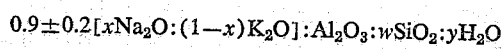

wherein "x" is a value from zero to 1, "w" is from about 4.5 to 4.9 and "y" in the fully hydrated form is about 7. Further characterization of zeolite D by means of X-ray diffraction techniques is described in copending application Serial No. 680,383, filed August 26, 1957. The preparative conditions for zeolite D and its ion-exchanged derivatives and their molecular sieving properties are also described therein.

Zeolite T is a synthetic crystalline zeolitic molecular sieve whose composition may be expressed, in terms of oxide mole ratios, as follows:

$$1.1 \pm 0.4[xNa_2O:(1-x)K_2O]:Al_2O_3:6.9\pm0.5SiO_2:yH_2O$$

wherein "x" is any value from about 0.1 to about 0.8 and "y" is any value from about zero to about 8. Further characterization of zeolite T by means of X-ray diffraction techniques is described in copending application Serial No. 733,819, filed May 8, 1958, now U.S. Patent No. 2,950,952, issued August 30, 1960.

Zeolite X is a synthetic crystalline zeolitic molecular sieve which may be represented by the formula:

$$0.9 \pm 0.2 M_{\frac{2}{n}}O:Al_2O_3:2.5\pm0.5SiO_2:yH_2O$$

wherein M represents a metal, particularly alkali and alkaline earth metals, n is the valence of M, and y may have any value up to about 8, depending on the identity of M and the degree of hydration of the crystalline zeolite. Zeolite X, its X-ray diffraction pattern, its properties, and methods for its preparation are described in detail in U.S. Patent No. 2,882,244, issued April 14, 1959.

Zeolite L is described and claimed in U.S. patent application Serial No. 711,565, filed January 28, 1958, and now abandoned.

Zeolite R is described and claimed in U.S. patent application Serial No. 680,381, filed August 26, 1957.

Zeolite S is described and claimed in U.S. patent application Serial No. 724,843, filed March 31, 1958.

Zeolite Y is described and claimed in U.S. patent application Serial No. 728,057, filed April 14, 1958, and now abandoned.

The crystalline molecular sieve zeolite X has been found particularly useful in the method of the present invention, and the latter will be described in detail with respect to zeolite X. It is to be understood, however, that the invention is equally applicable to the other previously discussed zeolites. The reasons for the superiority of zeolite X are not fully known, but may be due to its larger pore size allowing easier entry of an oxygen molecule into the internal areas, even though some of the pore systems through which the oxygen must diffuse may be partly taken up by silver which has already been oxidized. The superiority of zeolite X over zeolite Y, which has the same pore size, may lie in the higher cation density in zeolite X which results in the deposition of more silver by the particular method employed to introduce the silver.

In one embodiment, the invention includes the steps of providing a bed of cationic silver exchanged crystalline zeolite molecular sieve material, providing a hydrogen-containing gas stream and contacting such stream with the bed preferably at a rate such that the bed temperature is maintained below about 150° C. At least part of the silver therein is reduced to the elemental form. The cationic silver exchanged zeolite may be represented by the formula $Ag^+{}_2(X)$ and the combination with hydrogen may be conveniently expressed in the following manner, but it should be understood that this equation is not necessarily a concise mechanism.

$$Ag^+{}_2(X) + H_2 \rightarrow [H^+{}_2(X) \cdot 2Ag^0] \qquad (1)$$

Reaction 1 occurs at ambient temperature and is exothermic to the extent that sufficient hydrogen will produce excessive temperatures in the zeolite which could destroy the zeolitic structure. It has been found that the silver reduction Reaction 1 should be carried out at a temperature below about 150° C. to avoid such possible damage to the cell structure, and preferably in the temperature range of 20° C. to 35° C. for optimum results. The oxygen sorption capacity of the bed is decreased if the silver reduction is effected at a temperature above about 35° C. The reduction temperature may for example be controlled by diluting the hydrogen with an inert gas such as helium, argon or kryton, or by adding hydrogen in small increments.

After the silver reduction or activation step, the oxygen-containing feed gas mixture is contacted with the bed of elemental silver-containing zeolitic molecular sieve material for oxygen sorption thereby. The mechanism is probably approximately as follows:

$$[H^+{}_2(X) \cdot 2Ag^0] + O_2 \rightarrow [H^+{}_2(X) \cdot Ag^+{}_2O] \qquad (2)$$

Reaction 2 also proceeds readily at ambient temperature which leads to the belief that the metallic silver may be present in a non-crystalline, very finely dispersed form, perhaps even as discrete atoms.

The invention is conveniently practiced by enclosing the elemental silver-containing crystalline zeolite in a suitable chamber to form an adsorbent bed, admitting the gas mixture from which oxygen is to be removed and collecting the purified product gas at the effluent end of the zeolite-containing enclosure until the oxygen concentration in the product gas rises to a predetermined value for so-called "oxygen breakthrough." After oxygen breakthrough the bed may preferably be regenerated by contact with a hydrogen-containing stream at a temperature below about 150° C. and preferably between 20° C. and 35° C. to again reduce the silver cation to its elemental state and produce water as a by-product, according to the following equation:

$$H^+{}_2(X) \cdot Ag^+{}_2O + H_2 \rightarrow [H^+{}_2(X) \cdot 2Ag^0] + H_2O \qquad (3)$$

The water preferably remains substantially sorbed on the sieve for several hydrogen regenerations before removal by subjecting the bed to heat under a vacuum pressure. Water may be removed by heating between 100° C. and 350° C. under a partial vacuum. Alternately, the bed may be vacuum-desorbed after each cycle.

Illustrative of the manner in which the invention may be practiced, samples of cationic silver exchanged zeolite X were formed into pellets approximately 3/16 inch in diameter by 1/8 inch long without a binder and placed in tubes about six inches long by 3/4 inch in diameter, with degreased glass wool closing each end to form a bed. The tubes were then subjected to a partial vacuum-pressure, heated to 375° C., and maintained at this temperature overnight. After cooling to room temperature, the cationic silver exchanged zeolite X was activated and the silver reduced to the elemental form by adding successively larger increments of hydrogen gas to the partially evacuated bed. The amount of each increment was adjusted so that the temperature of the bed did not rise above 35° C.

After reduction, the hydrogen was pumped off the bed to approximately 50 microns Hg pressure and an oxygen-contaminated argon feed stream was passed over the bed at atmospheric pressure and room temperature and at a rate of about 30 cc./minute. During the feed stream contact period a warm zone was observed to move through the bed and eventually the end of the bed in contact with the incoming gas mixture turned brown, indicating oxygenation of the silver-containing zeolite. An analyzer capable of detecting 0.1% oxygen was employed to analyze the effluent and breakthrough values were recorded as the time of first detectable oxygen content. After breakthrough, the flow of feed gas through the bed was terminated and the bed was evacuated to a pressure of about 20 microns Hg. The bed was then either reactivated with hydrogen, or heated and subjected to a vacuum, or both as shown in Table I following:

TABLE I

Oxygen Sorption by Elemental Silver Loaded Zeolite X

| Cycle No. | Bed Wgt. (gms.) | Bed Treatment | Percent $O_2$ in Feed | Time to Breakthrough (min.) | cc. $O_2$ Removed | cc. $O_2$ removed/ gram of zeolite/ cycle |
|---|---|---|---|---|---|---|
| 1 | 38.5 | 4 hr. $H_2$ reduction at room temperature | 3 | 250 | 225 | 5.8 |
| 2 | 38.5 | 3 hr. $H_2$ reduction at room temperature followed by 3 hr. at 350° C. under vacuum of about 25 microns. | 3 | 96 | 86.4 | 2.2 |
| 1 | 41.0 | 3 hr. $H_2$ reduction at room temperature | 3 | 80 | 72 | 1.7 |
| 2 | 41.0 | 10 min. $H_2$ reduction followed by hr. at 200° C. under vacuum of about 25 microns. | 3 | 30 | 27 | 0.7 |
| 3 | 41.0 | 10 min. $H_2$ reduction with no heating | 3 | 32 | 28.8 | 0.7 |
| 1 | 41.5 | 6 hr. $H_2$ reduction at room temperature | 7 | 24 | 50.4 | 1.2 |
| 1 | 35 | 6 hr. $H_2$ reduction (at room temperature for cycles 1-6). | 3 | 210 | 189 | 5.4 |
| 2 | 35 | 50 min. $H_2$ reduction | 3 | 230 | 207 | 5.9 |
| 3 | 35 | 25 min. $H_2$ reduction | 3 | 160 | 144 | 4.1 |
| 4 | 35 | 25 min. $H_2$ reduction | 3 | 144 | 130 | 3.7 |
| 5 | 35 | 15 hr. $H_2$ reduction | 3 | 353 | 317.7 | 9.0 |
| 6 | 35 | 17 hr. $H_2$ reduction | 3 | 375 | 337.5 | 9.6 |
| 1 | 35 | 24 hr. $H_2$ reduction at room temperature | 3 | 553 | 497.7 | 14 |
| 2 | 35 | 17 hr. $H_2$ reduction at room temperature | 3 | 375 | 337.5 | 9.6 |

The data in Table I show that oxygen contents of 7% and 3% in the initial feed may consistently be lowered below 0.1% oxygen.

In another test, 150 grams of silver ion-exchanged zeolite X were formed into pellets approximately 3/16 inch in diameter by 1/8 inch long with an Attapulgus clay binder and placed in a cylindrical metal cartridge 1 inch in diameter by 10 inches long. The cationic silver-exchanged zeolite X was then activated with hydrogen diluted with argon by controlled admission of small increments of hydrogen so that the temperature did not rise above 35° C. The cartridge was then evacuated to approximately 50 microns Hg pressure to remove excess hydrogen, and then filled to atmospheric pressure with gaseous argon for storage. Next, argon containing 44 p.p.m. $O_2$ was passed through the cylinder at a rate of 1.2 ft.³/hr. and at a pressure of 10 p.s.i.g. for a period of 30 minutes at room temperature. The concentration of oxygen in the effluent was determined with an instrument which utilized a galvanic cell consisting of an activated cadmium anode and a silver cathode. The millivolt output of the cell is directly proportioned to the oxygen concentration of the sample gas. Using this procedure the effluent stream was found to contain 3 p.p.m. $O_2$. Stated another way, the elemental silver-containing zeolite X removed 41 p.p.m. oxygen. No warm zone was observed to pass through the bed although a feed containing more than 1% $O_2$ would probably produce a warm zone which could be observed to pass through the bed.

The deleterious effects of hydrogen contamination such as embrittlement in reactive metals such as titanium and zirconium and their alloys is well recognized. One method for eliminating hydrogen is by carrying out the casting of such metals in a protective atmosphere from which hydrogen gas is removed.

The present invention also provides a highly efficient method for removing hydrogen from a hydrogen-containing gas mixture. That is, a bed of cationic silver-exchanged zeolitic molecular sieve material may be provided for example in the previously described manner, and the hydrogen-containing feed stream is contacted with the bed for hydrogen sorption thereby. The previously described Reaction 1 occurs, and the resulting hydrogen-depleted gas is discharged from the bed as a product gas. Again the reaction should be carried out at a temperature below about 150° C. to avoid damage to the zeolitic structure, and preferably at a temperature below about 35° C. for optimum results. When the molecular sieve becomes loaded with hydrogen, it may be regenerated by subjecting it to a mild oxidation as by treating it with low partial pressure or small increments of oxygen gas at a temperature preferably below 35° C. In this manner the silver which had been reduced to its elemental state in the hydrogen Reaction 1 is raised to its oxidized state as it was in the cationic form. The caution to be observed in the regeneration step is the avoidance of increased temperatures which would reduce the resultant activity of the hydrogen sorption. The deleterious effect of elevated temperatures is believed due to an agglomeration of the dispersed silver with the resultant decrease in its availability.

It should also be understood that the present invention contemplates a process for successive removal of hydrogen from a hydrogen-containing gas stream and oxygen from an oxygen-containing gas stream by means of a silver-containing molecular sieve.

Although preferred embodiments of the invention have been described in detail, it is contemplated that modifications of the process may be made and that some features may be employed without others, all within the spirit and scope of the invention.

What is claimed is:

1. A process for removing oxygen from an oxygen-containing gas mixture comprising the steps of providing a bed of elemental silver-containing crystalline zeolitic molecular sieve material, contacting and reacting said oxygen-containing gas mixture with said bed thereby removing said oxygen from said oxygen-containing gas mixture, and discharging the resulting oxygen-depleted gas from the bed.

2. A process for removing oxygen from an oxygen-containing gas mixture comprising the steps of providing a bed of cationic silver exchanged crystalline zeolitic molecular sieve material; providing a hydrogen-containing gas stream and contacting and reacting such stream with said bed at a rate such that the bed temperature is maintained below about 150° C., thereby reducing at least part of the silver therein to the elemental form; thereafter providing the oxygen-containing feed gas mixture and contacting and reacting such feed gas with the bed of elemental silver-containing zeolitic molecular sieve material thereby removing said oxygen from said oxygen-containing gas mixture; and discharging the resulting oxygen-depleted gas from the bed.

3. A process according to claim 2 for removing oxygen from an oxygen-containing gas mixture, in which the crystalline zeolitic molecular sieve bed is maintained at a temperature below about 35° C. during contact with said hydrogen-containing gas stream.

4. A process according to claim 2 for removing oxygen from an oxygen-containing gas mixture, in which the crystalline zeolitic molecular sieve bed is maintained at a temperature between about 20° C. and 35° C. during contact with said hydrogen-containing gas stream.

5. A process according to claim 2 for removing oxygen from an oxygen-containing gas mixture, in which the bed of cationic silver exchanged zeolitic molecular sieve material is activated by heating at a temperture of at least 200° C. under a vacuum pressure, before contact with said hydrogen-containing gas stream.

6. A process for removing oxygen from an oxygen-containing gas mixture comprising the steps of providing a bed of cationic silver exchanged zeolite X; activating the bed by heating thereof to a temperature of at least 200° C. under a vacuum pressure; providing a hydrogen-containing gas stream and contacting and reacting such stream with said bed at a rate such that the bed temperature is maintained below about 150° C., thereby reducing at least part of the silver therein to the elemental form; thereafter providing the oxygen-containing feed gas mixture and contacting and reacting such feed gas with the activated bed of elemental silver-containing zeolite X thereby removing said oxygen from said oxygen-containing gas mixture; and discharging the resulting oxygen-depleted gas from the bed.

7. A process according to claim 6 for removing oxygen from an oxygen-containing gas mixture in which said cationic silver exchanged zeolite X is obtained by ion-exchanging sodium zeolite X with a silver salt.

8. A process according to claim 2 for removing oxygen from an oxygen-containing gas mixture, in which the cationic silver exchanged zeolite is obtained by ion-exchanging a silver salt with a member selected from the group consisting of the naturally occurring zeolitic molecular sieves chabazite, faujasite, erionite and mordenite, and the synthetic zeolitic molecular sieve types A, D, L, R, S, T, X and Y.

9. A process for removing oxygen from an oxygen-containing gas mixture comprising the steps of providing a bed of elemental silver-containing crystalline zeolitic molecular sieve material; contacting and reacting said oxygen-containing gas mixture with said bed thereby oxidizing said elemental silver and removing said oxygen from said oxygen-containing gas mixture; discharging the resulting oxygen-depleted gas from the bed; continuing the gas mixture contact and gas discharge from said bed until the oxygen concentration in the discharge gas reaches a predetermined value; regenerating the resulting oxygen-loaded bed by providing a hydrogen-containing gas stream and contacting and reacting such stream with the bed at a temperature below about 150° C. so as to reduce the silver to its elemental form and produce water; thereafter activating the bed and purging said water therefrom by heating at a temperature between about 100° C. and 350° C. under a vacuum pressure; and contacting and reacting additional oxygen-containing gas mixture with the regenerated and activated zeolitic molecular sieve material for further oxygen removal therein.

10. A process according to claim 9 for removing oxygen from an oxygen-containing gas mixture, in which the oxygen loaded bed is regenerated by contact with said hydrogen-containing gas stream at a temperature between about 20° C. and 35° C.

11. A process for removing hydrogen from a hydrogen-containing gas mixture comprising the steps of providing a bed of cationic silver exchanged zeolitic molecular sieve material, contacting and reacting said hydrogen containing gas mixture with said bed, at a rate such that the bed temperature is maintained below about 150° C. thereby reducing at least part of said cationic silver to its elemental form and removing said hydrogen from said hydrogen-containing gas mixture, and discharging the resulting hydrogen-depleted gas from the bed.

12. A process according to claim 11 for removing hydrogen from a hydrogen-containing gas mixture, in which the cationic silver exchanged zeolite is obtained by ion-exchanging a silver salt with a member selected from the group consisting of the naturally occurring zeolitic molecular sieves chabazite, faujasite, erionite and mordenite, and the synthetic zeolitic molecular sieve types A, D, L, R, S, T, X and Y.

13. A process according to claim 12 for removing hydrogen from a hydrogen-containing gas mixture, in which the crystalline zeolitic molceular sieve bed is maintained at a temperature below about 35° C. during contact with said hydrogen-containing gas mixture.

14. A process for removing hydrogen from a hydrogen-containing gas mixture comprising the steps of providing a bed of cationic silver exchanged zeolitic molecular sieve material; contacting and reacting said hydrogen-containing gas mixture with said bed, at a rate such that the bed temperature is maintained below about 150° C. thereby reducing at least part of said cationic silver to its elemental form and removing said hydrogen from said hydrogen-containing gas mixture; discharging the resulting hydrogen-depleted gas from the bed; continuing the gas mixture contact and gas discharge from said bed until the hydrogen concentration in the discharge gas reaches a predetermined value; regenerating the resulting hydrogen-loaded bed by providing an oxygen-containing gas stream and contacting and reacting such stream with the bed so as to reoxidize the silver; and thereafter contacting and reacting additional hydrogen-containing gas mixture with the regenerated zeolitic molecular sieve material for further hydrogen removal therein.

15. A process according to claim 14 for removing hydrogen from a hydrogen-containing gas mixture, in which the crystalline zeolitic molecular sieve bed is maintained below about 35° C. during contact with said oxygen-containing gas stream for regeneration.

16. A process for removing oxygen from an oxygen containing gas mixture comprising the steps of providing a bed of elemental silver-containing crystalline zeolitic molecular sieve material; contacting and reacting said oxygen-containing gas mixture with said bed thereby oxidizing said elemental silver and removing said oxygen from said oxygen-containing gas mixture; discharging the resulting oxygen-depleted gas from the bed; continuing the gas mixture contact and gas discharge from said bed until the oxygen concentration in the discharge gas reaches a predetermined value; regenerating the resulting oxygen loaded bed by providing a hydrogen-containing gas stream and contacting and reacting such stream with the bed at a temperature below about 150° C. thereby reducing the silver to its elemental form; thereafter contacting and reacting additional oxygen-containing gas mixture with the regenerated zeolitic molecular sieve material for further oxygen removal therein.

17. A process for the alternate removal of oxygen from an oxygen-containing gas mixture and hydrogen from a hydrogen-containing gas mixture which comprises the steps of providing a bed of elemental silver-containing crystalline zeolitic molecular sieve material; contacting and reacting said oxygen containing gas mixture with said bed thereby oxidizing said elemental silver and removing said oxygen from said oxygen-containing gas mixture; discharging the resulting oxygen-depleted gas from said bed; continuing the oxygen-containing gas mixture contact and oxygen-depleted gas discharge from said bed until the oxygen concentration in the discharge gas reaches a predetermined value; then contacting and reacting said oxygen-loaded bed with said hydrogen-containing gas stream at a temperature below about 150° C. thereby reducing the silver to its elemental form and removing said hydrogen from said hydrogen-containing gas mixture; discharging the resulting hydrogen-depleted gas from said bed; continuing the hydrogen-containing gas mixture contact and hydrogen-depleted gas discharge from said bed until the hydrogen concentration in the discharge gas reaches a predetermined value; and thereafter contacting and reacting additional oxygen containing gas mixture with said bed for further oxygen removal therein.

18. A process as described in claim 16 wherein the zeolitic molecular sieve material is periodically activated by heating said material at a temperature between about 100° C. and 350° C. under a vacuum pressure to remove sorbed water produced by successively contacting and reacting said material with said oxygen-containing and hydrogen-containing gas mixtures.

19. A process as described in claim 17 wherein the zeolitic molecular sieve material is periodically activated by heating said material at a temperature between about 100° C. and 350° C. under a vacuum pressure to remove sorbed water produced by successively contacting and reacting said material with said oxygen-containing and hydrogen-containing gas mixtures.

References Cited in the file of this patent

UNITED STATES PATENTS

| | | |
|---|---|---|
| 2,882,243 | Milton | Apr. 14, 1959 |
| 2,882,244 | Milton | Apr. 14, 1959 |